US010049483B2

(12) United States Patent
Kim et al.

(10) Patent No.: US 10,049,483 B2
(45) Date of Patent: Aug. 14, 2018

(54) APPARATUS AND METHOD FOR GENERATING ANIMATION

(71) Applicant: ELECTRONICS AND TELECOMMUNICATIONS RESEARCH INSTITUTE, Daejeon (KR)

(72) Inventors: Ye-Jin Kim, Daejeon (KR); Myung-Gyu Kim, Daejeon (KR); Jong-Sung Kim, Daejeon (KR); Seong-Min Baek, Daejeon (KR); Sang-Woo Seo, Daejeon (KR); Il-Kwon Jeong, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 207 days.

(21) Appl. No.: 14/997,661

(22) Filed: Jan. 18, 2016

(65) Prior Publication Data
US 2016/0232698 A1    Aug. 11, 2016

(30) Foreign Application Priority Data

Feb. 6, 2015 (KR) .......................... 10-2015-0018666

(51) Int. Cl.
*G06T 13/40* (2011.01)
*G06F 3/0488* (2013.01)
*G06K 9/00* (2006.01)

(52) U.S. Cl.
CPC .......... *G06T 13/40* (2013.01); *G06F 3/04883* (2013.01); *G06K 9/00369* (2013.01)

(58) Field of Classification Search
CPC ..... G06T 13/40; G06T 2213/12; G06T 19/20; A63F 2300/6607
See application file for complete search history.

(56) References Cited

U.S. PATENT DOCUMENTS 6,462,742 B1 * 10/2002 Rose ....................... G06T 13/40
                                                                    345/473
7,568,171 B2    7/2009 Boylan
(Continued)

FOREIGN PATENT DOCUMENTS

KR    10-2009-0053182 A    5/2009
KR    10-2011-0062044 A    6/2011
(Continued)

OTHER PUBLICATIONS

Park, Sang Il, Hyun Joon Shin, and Sung Yong Shin. "On-line locomotion generation based on motion blending." Proceedings of the 2002 ACM SIGGRAPH/Eurographics symposium on Computer animation. ACM, 2002.*
Choi, Myung Geol, et al. "Retrieval and visualization of human motion data via stick figures." Computer Graphics Forum. vol. 31. No. 7. Blackwell Publishing Ltd, 2012.*
Kyungyong Yang et al, "Creating Keyframe Animation Using Sketch-based Interface" Korea Computer Congress, vol. 35, No. 1(B), pp. 250-255, 2008.
(Continued)

*Primary Examiner* — Vincent Rudolph
*Assistant Examiner* — Raphael Schwartz
(74) *Attorney, Agent, or Firm* — LRK Patent Law Firm (57) ABSTRACT

An apparatus for generating animation includes: an input interface receiving a motion path sketch input and a posture sketch input from a user; a motion path information generator generating motion path information corresponding to the motion path sketch input; a posture information generator generating posture information corresponding to the posture sketch input; a similar motion clip retriever retrieving a similar motion clip corresponding to the posture information among motion clips stored in a database; a motion information generator generating motion information including a frame of the similar motion clip disposed according to the motion path information; and an animation generator generating animation by rendering a graphic model according to the motion information.

8 Claims, 10 Drawing Sheets

(56) References Cited

U.S. PATENT DOCUMENTS

| 9,381,426 B1* | 7/2016 | Hughes | H04L 67/06 |
|---|---|---|---|
| 2009/0135189 A1 | 5/2009 | Kim et al. | |
| 2011/0128292 A1 | 6/2011 | Ghyme et al. | |

FOREIGN PATENT DOCUMENTS

| KR | 10-2011-0129171 A | 12/2011 |
|---|---|---|
| KR | 10-2013-0030117 A | 3/2013 |
| KR | 10-2013-0059035 A | 6/2013 |
| KR | 10-1363331 B1 | 2/2014 |

OTHER PUBLICATIONS

C. Mao et al, "A Sketch-Based Gesture Interface for Rough 3D Stick Figure Animation", Eurographics Workshop on Ketch-Based Interfaces and Modeling, pp. 175-183, 2005.
R. Yang et al, "Life-Sketch: A Framework for Sketch-Based Modelling and Animation of 3D Objects", Proceedings of 11th Australasian User Interface Conference, pp. 61-70, 2010.
T. Mattehws et al, "A Sketch-Based Articulated Figure Animation Tool" Proceedings of the South African Institute of Computer Scientists and Information Technologists Conference on Knowledge, Innovation and Leadership in a Diverse, Multidisciplinary Environment, pp. 151-160, 2011.

* cited by examiner

APPARATUS AND METHOD FOR GENERATING ANIMATION

CROSS REFERENCE TO RELATED APPLICATION

This application claims the benefit of Korean Patent Application No. 10-2015-0018666, filed on Feb. 6, 2015, entitled "Apparatus and method for Generating Animation", which is hereby incorporated by reference in its entirety into this application.

BACKGROUND OF THE INVENTION

1. Technical Field

The present invention relates to a technology for generating animation, and more particularly, to a technology for generating animation corresponding to a user's sketch input.

2. Description of the Related Art

A 3-dimensional (3D) virtual character has been widely used in digital content fields such as movie, game, and virtual environment. Generally, to produce animation including the virtual character, a key-framed scheme for using a posture of a 3D character model articulated by multiple joints as a main frame has been mostly used. According to the key-framed scheme, if the user directly edits the posture of the model, an animation system includes a process of automatically generating in-between frames. Accordingly, the key-framed scheme has an advantage in that the user may freely generate his/her wanted style of character animation but requires a lot of user's efforts and time since a process of producing a motion posture corresponding to the main frame requires a repetitive editing process for the following reason. First, since an articulated skeleton forming the character model has a high degree of freedom, to perform a process of controlling, by a user, a large number of joints to generate a high quality of motion posture, professional training and physical knowledge on a motion of a human body are required. Second, to show natural character animation, a motion posture more than 24 frames per second needs to be generated. To this end, even a professional animator takes up much time to edit a main posture. Third, most 3D modeling tools for editing the motion posture has a complex editing process and a user interface. Therefore, general users can hardly produce a high quality of animation using the 3D modeling tools. For the reasons, to produce the high quality of 3D character animation by the current key-framed scheme, a larger number of animation experts are required to produce even animation having a short length.

A motion capture scheme developed to overcome some of the disadvantages of the key-framed scheme is a technology for tracking motions of an actor using a plurality of cameras when the actor directly takes the motion of the virtual character and then recovering them to 3D motion data. The motion capture scheme may be used for the 3D character animation production pipeline by fitting an articulated skeleton to the motion-captured 3D motion data. Since the motion data generated by the motion capture scheme are generated by the scheme of directly capturing a motion of an actor, the motion capture scheme may guarantee very realistic animation but for the following reasons, it is difficult to reuse the data as other purposes. First, since the motion data generated while a motion is captured more than 24 frames per second in response to a camera speed have high continuity and density of a frame, if the user edits the captured data, physical validity that is an important factor of the motion included in the continued frames may be easily broken. Therefore, when the captured data are edited based on the user's desired style of motions, quality degradation in results may easily occur due to motion unnaturalness and motion noise. Second, generally, a motion capture system for tracking and recovering a high quality of motion data is very expensive and requires a wide space as well as may be used only by many operating personnel who get professional education. Finally, in the motion capture scheme, a factor most affecting the motion quality is an actor's skill. In particular, a high quality of motion data for complex and dynamic motions such as dance or exercise are hardly extracted from motions of the general public. Therefore, to produce various 3D character animations by using the motion data generated by the current motion capture scheme, a tool and a motion editing expert for professionally editing the captured data are required.

SUMMARY OF THE INVENTION

The present invention has been made in an effort to provide an apparatus and a method for retrieving a motion corresponding to a user's sketch input and generating animation including the retrieved motion.

However, objects of the present invention are not limited to the above-mentioned matters and other objects can be clearly understood to those skilled in the art from the following descriptions.

According to an exemplary embodiment of the present invention, there is provided an apparatus for generating animation, including: an input interface receiving a motion path sketch input and a posture sketch input from a user; a motion path information generator generating motion path information corresponding to the motion path sketch input; a posture information generator generating posture information corresponding to the posture sketch input; a similar motion clip retriever retrieving a similar motion clip corresponding to the posture information among motion clips stored in a database; a motion information generator generating motion information including a frame of the similar motion clip disposed according to the motion path information; and an animation generator generating animation by rendering a graphic model according to the motion information.

The motion path information generator may extract a sample point from the motion path sketch input, adjust a position of the sample point using a smoothing filter, generate a curved line corresponding to the sample point using a curve fitting scheme, and generate the motion path information representing the curved line.

The posture information generator may generate posture information including end-effectors of each segment of the posture sketch input and a posture feature point corresponding to an intersecting point of three segments.

The similar motion clip retriever may calculate a sum of differences between posture vectors included in each frame of the motion clip included in the database and posture vectors according to the posture information and extract a motion clip including the similar motion frame in which the sum of the differences between the posture vectors is equal to or less than a threshold value as the similar motion clip.

The motion information generator may receive a disposition input setting a position of the similar frame from a user, correct positions of each frame included in the similar motion clip according to the disposition input, and generate the motion information including a frame in which the similar motion clips are blended.

The motion information generator may set the positions on the curved line of each frame included in the similar motion clip so that a difference in time to play the similar frame and each frame included in the similar motion clip is proportional to a distance from a similar frame point on the curved line.

The motion information generator may calculate, as a blending duration, a value obtained by dividing differences between maximum difference end-effectors among the corresponding end-effectors of each similar frame for one similar motion clip and other similar motion clips by a product of an absolute value of a difference between an average value of moving distances of the maximum difference end-effectors within the one similar motion clip and an average value of moving distances of the maximum difference end-effectors within the other similar motion clips and a frame rate of the similar motion clip, and perform blending between the one similar motion clip and the other similar motion clips through the blending duration.

The motion information generator may select a frame in which a distance between a foot of a graphic model and a ground and an acceleration of a foot are equal to or less than a preset value among the respective frames of the motion information as a foot fixed frame, calculate an average on positions of the foot of the respective graphic models on the foot fixed frame as a foot fixed position, fix the foot of the graphic model at the foot fixed position on the foot fixed frame, sequentially control the rest joints of the graphic model according to an inverse kinematics technique, and perform interpolation on all joints other than the foot of the graphic model included in other frames other than the foot fixed frame and the foot fixed frame.

According to another exemplary embodiment of the present invention, there is provided a method for generating animation by an apparatus for generating animation, including: receiving a motion path sketch input and a posture sketch input from a user; generating motion path information corresponding to the motion path sketch input; generating posture information corresponding to the posture sketch input; retrieving a similar motion clip corresponding to the posture information among motion clips stored in a database; generating motion information including a frame of the similar motion clip disposed according to the motion path information; and generating animation by rendering a graphic model according to the motion information.

The generating of the motion path information corresponding to the motion path sketch input may include: extracting a sample point from the motion path sketch input; adjusting a position of the sample point using a smoothing filter; generating a curved line corresponding to the sample point using a curve fitting scheme; and generating the motion path information representing the curved line.

In the generating of the posture information corresponding to the posture sketch input, posture information including end-effectors of each segment of the posture sketch input and a posture feature point corresponding to an intersecting point among three segments may be generated.

The retrieving of the similar motion clip corresponding to the posture information among motion clips stored in the database may include: calculating a sum of differences between posture vectors included in each frame of the motion clip included in the database and posture vectors according to the posture information; and extracting the motion clip including the similar motion frame in which the sum of the differences between the posture vectors is equal to or less than a threshold value as a similar motion clip.

The generating of the motion information including the similar motion clip may include: receiving a disposition input setting a position of the similar frame from the user; correcting positions of each frame included in the similar motion clip according to the disposition input, and generating the motion information including a frame in which the similar motion clips are blended.

In the correcting of the positions of each frame included in the similar motion clip according to the disposition input, the positions on the curved line of each frame included in the similar motion clip may be set so that a difference in time to play the similar frame and each frame included in the similar motion clip is proportional to a distance from a similar frame point on the curved line.

The generating of the motion information including the frame in which the similar motion clips are blended may include: setting, as a blending duration, a value obtained by dividing differences between maximum difference end-effectors among the corresponding end-effectors of each similar frame for one similar motion clip and other similar motion clips by a product of an absolute value of a difference between an average value of moving distances of the maximum difference end-effectors within the one similar motion clip and an average value of moving distances of the maximum difference end-effectors within the other similar motion clips and a frame rate of the similar motion clip; and performing blending between the one similar motion clip and the other similar motion clips through the blending duration.

The generating of the motion information including the similar motion clip may include: selecting a frame in which a distance between a foot of a graphic model and a ground and an acceleration of a foot are equal to or less than a preset value among the respective frames of the motion information as a foot fixed frame; calculating an average on positions of the foot of the respective graphic models on the foot fixed frame as a foot fixed position; fixing the foot of the graphic model at the foot fixed position on the foot fixed frame and sequentially controlling the rest joints of the graphic model according to an inverse kinematics technique; and performing interpolation on all joints other than the foot of the graphic model included in other frames other than the foot fixed frame and the foot fixed frame.

BRIEF DESCRIPTION OF THE DRAWINGS

Hereinafter, the present invention will be described with reference to exemplary embodiments illustrated in the accompanying drawings. To help understanding, throughout the accompanying drawings, like components are denoted by like reference numerals. Components illustrated in the accompanying drawings are only an example exemplarily implemented for describing the present invention and therefore do not limit the scope of the present invention.

DESCRIPTION OF EXEMPLARY EMBODIMENTS

Since the present invention may be variously modified and have several exemplary embodiments, specific exemplary embodiments will be shown in the accompanying drawings and be described in detail in a detailed description. However, it is to be understood that the present invention is not limited to the specific exemplary embodiments, but includes all modifications, equivalents, and substitutions included in the spirit and the scope of the present invention.

Further, in the present specification, it is to be understood that when one component is referred to as "transmitting" a signal to another component, one component may be directly connected to another component to transmit a signal to another component or may transmit a signal to another component through any other components unless explicitly described to the contrary.

Figure 1:
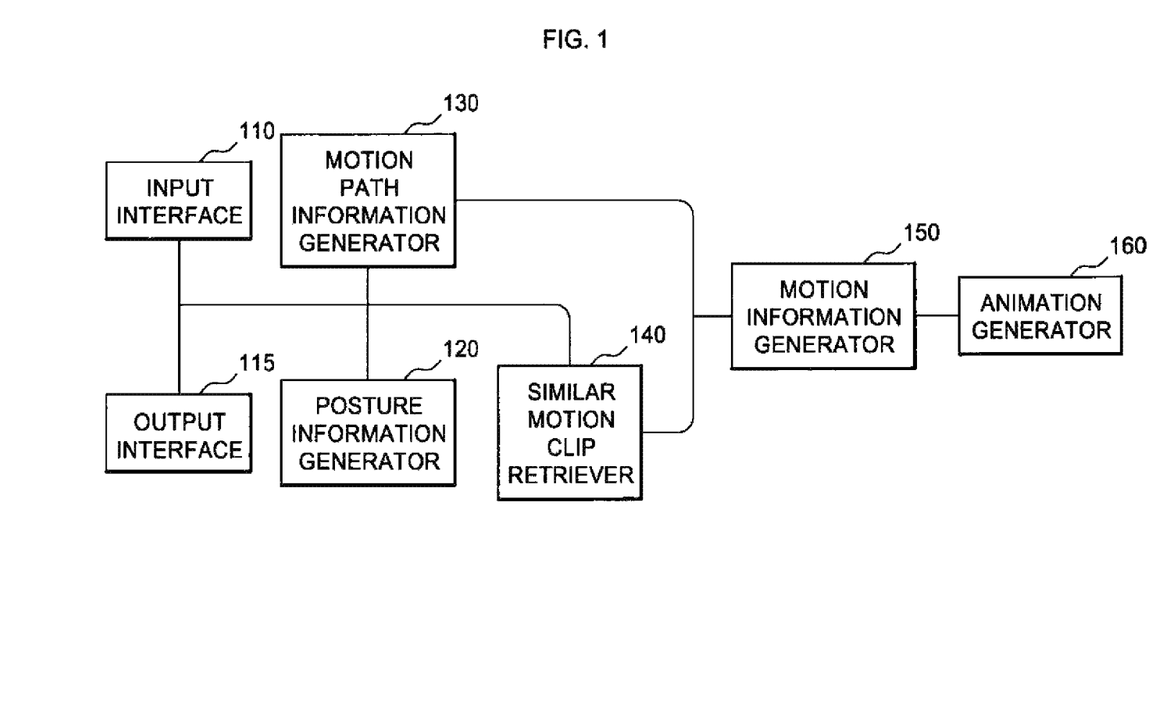
FIG. 1 is a block diagram illustrating an apparatus for generating animation according to an exemplary embodiment of the present invention.

FIG. 1 is a block diagram illustrating an apparatus for generating animation according to an exemplary embodiment of the present invention.

Referring to FIG. 1, an apparatus for generating animation includes an input interface 110, an output interface 115, a motion path information generator 120, a posture information generator 130, a similar motion clip retriever 140, a motion information generator 150, and an animation generator 160.

The input interface 110 receives, from a user, a motion path sketch input that represents a path along which a graphic model moves by a line using input apparatuses such as an electronic pen, a touch pad, and a mouse and a posture sketch input inputting a skeleton structure in which a posture of a graphic model is represented by a line. The input interface 110 transmits the motion path sketch input to the motion path information generator 120 and transmits the posture sketch input to the posture information generator 130.

The output interface 115 receives motion path information from the posture information generator 130 and outputs a curved line according to the motion path information. The output interface 115 may be connected to display apparatuses such as a monitor, a touch screen, and a projector to transmit an image outputting the curved line according to the motion path information based on a pre-established protocol.

The motion path information generator 120 applies a smoothing filter and curve fitting to generate the motion path information that is curved information corresponding to the motion path sketch input. The motion path information generator 120 transmits the motion path information to the motion information generator 150. Hereinafter, a process of generating motion path information will be described in detail with reference to FIGS. 6 and 7.

The posture information generator 130 sets end-effectors of each segment of the posture sketch input as any one point of a head, a left hand, a right hand, a left foot, and a right foot, sets an intersecting point of three segments as a central point, and generates posture information including posture vectors that are differences between the respective end-effectors and the central points. The posture information generator 130 transmits the posture information to the similar motion clip retriever 140. Hereinafter, a process of generating posture information according to the posture sketch input will be described in detail with reference to FIGS. 4 and 5.

The similar motion clip retriever 140 selects as a similar motion clip a motion clip that includes a posture vector similar to posture information among motion clips including the pre-established posture vectors of motions included in the database. The posture vectors are vectors corresponding to differences between centers and the rest posture feature points among posture feature points and the posture vector will be described below in detail with reference to FIG. 7. In this case, the similar motion clip retriever 140 may include the database including the plurality of motion clips including the pre-established posture vectors of motions or may be connected to the corresponding database. The process of selecting a similar motion clip included in the database will be described in detail with reference to FIG. 3.

The motion information generator 150 performs concatenation on a plurality of similar motion clips so that the plurality of similar motion clips correspond to each frame, thereby generating the motion information. Further, the motion information generator 150 applies inverse kinematics to the motion information to perform a process of correcting motion information including a step of removing a foot-skate phenomenon and a step of correcting a joint position between frames. The process of correcting motion information will be described below in detail with reference to FIG. 9.

The animation generator 160 renders a motion of a graphic model according to the motion information to generate animation.

Figure 2:
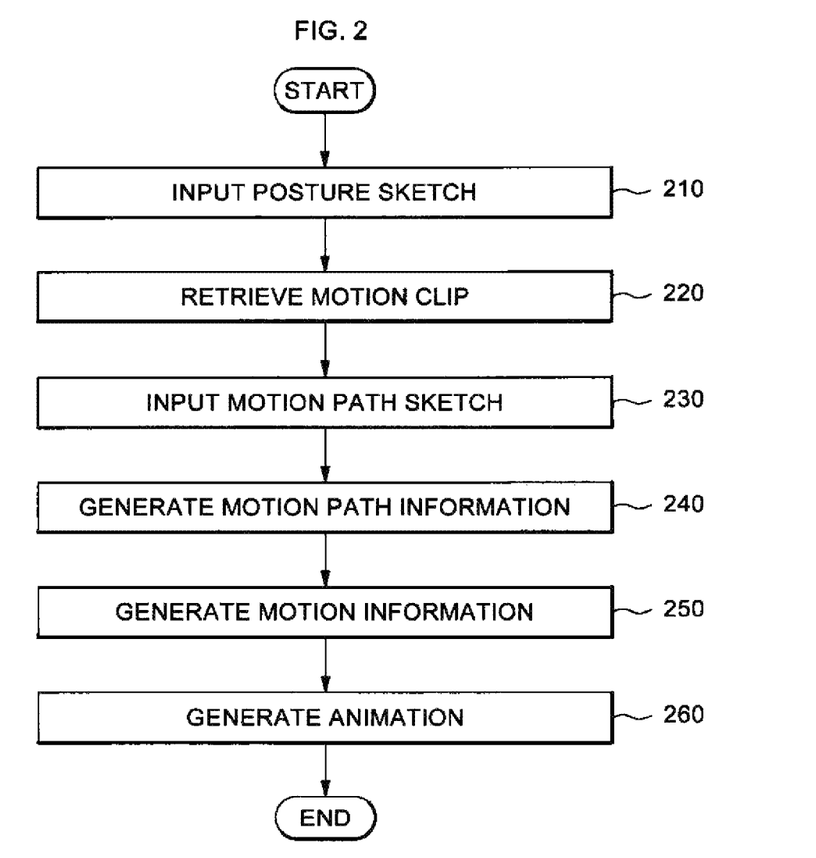
FIG. 2 is a flow chart illustrating a process of generating, by the apparatus for generating animation according to the exemplary embodiment of the present invention, animation.
Figure 3:
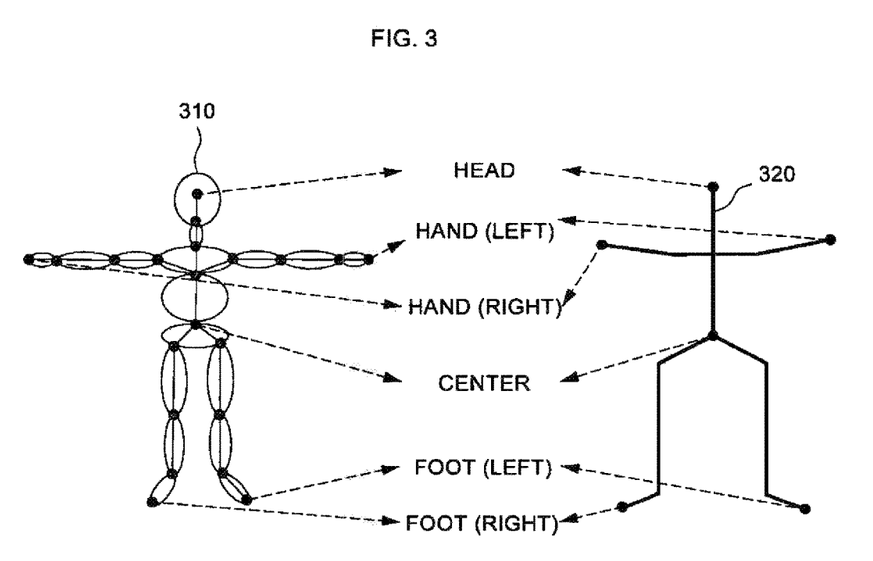
FIG. 3 is a diagram illustrating a posture sketch input received by the apparatus for generating animation according to the exemplary embodiment of the present invention from a user.

FIG. 2 is a flow chart illustrating a process of generating, by the apparatus for generating animation according to the exemplary embodiment of the present invention, animation and FIG. 3 is a diagram illustrating a posture sketch input received by the apparatus for generating animation according to the exemplary embodiment of the present invention from a user. Each process to be described below is processes performed by each function part configuring the apparatus for generating animation, but for simple and clear description of the present invention, subjects of each process are collectively called the apparatus for generating animation.

Referring to FIG. 2, in step 210, the apparatus for generating animation receives a posture sketch input from a user. For example, the user may use input apparatuses such as an electronic pen, a touch pad, and a mouse to receive the posture sketch input inputting a skeleton model that represents the posture of the graphic model by a line. That is, the user may receive the posture sketch input inputting the skeleton model like 310 of FIG. 3. In this case, each end-effector of the posture sketch input 310 corresponds to a head, a hand, and a foot of the articulated character and a point at which three segments of the posture sketch input intersect with each other may correspond to a center of the articulated character.

In step 220, the apparatus for generating animation retrieves the motion clip corresponding to the posture sketch input within the pre-installed database.

In step 230, the apparatus for generating animation receives the motion path sketch input from the user. For example, the user may use the input apparatuses such as an electronic pen, a touch pad, and a mouse to receive the motion path sketch input that is an input drawing the motion path by a line, in which the motion path is a path along which the graphic model moves.

In step 240, the apparatus for generating animation generates the motion path information corresponding to the motion path sketch input. The apparatus for generating animation applies a smoothing filter and curve fitting to generate the motion path information that is curved information corresponding to the motion path sketch input. Hereinafter, the process of generating motion path information will be described in detail with reference to FIGS. 3 and 4.

In step 250, the apparatus for generating animation disposes the frame of the retrieved motion clip at a position according to the motion path information, blends each of the disposed frames, and generates the corrected motion information. The process of disposing a motion clip according to the motion path information will be described in detail with reference to FIG. 8.

In step 260, the apparatus for generating animation generates the animation in which the graphic model moves according to the motion information.

Figure 4:
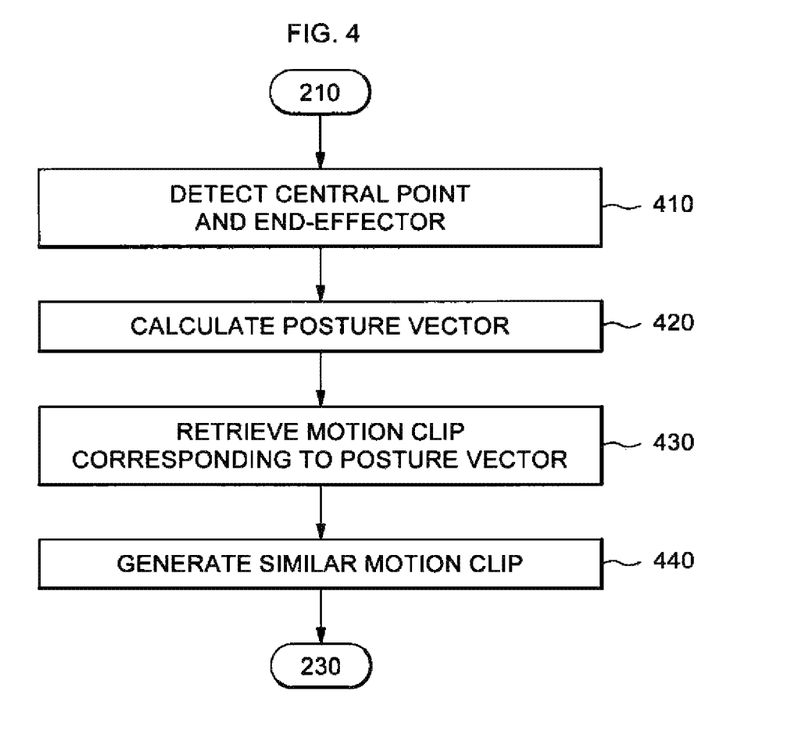
FIG. 4 is a diagram illustrating a process of generating, by the apparatus for generating animation according to the exemplary embodiment of the present invention, a similar motion clip according to the posture sketch input.
Figure 5:
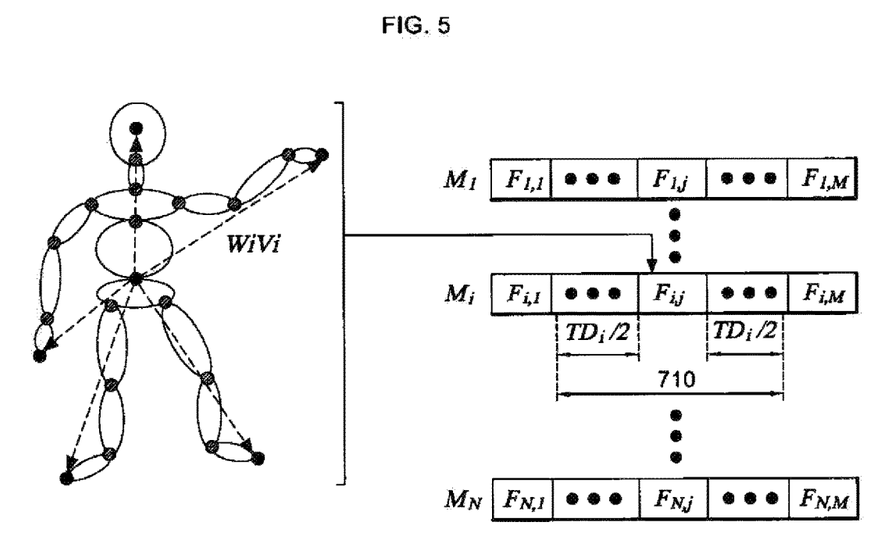
FIG. 5 is a diagram illustrating a posture vector stored in a database of the apparatus for generating animation according to the exemplary embodiment of the present invention.

FIG. 4 is a diagram illustrating a process of generating, by the apparatus for generating animation according to the exemplary embodiment of the present invention, a similar motion clip according to the posture sketch input and FIG. 5 is a diagram illustrating a posture vector stored in a database of the apparatus for generating animation according to the exemplary embodiment of the present invention. That is, the process illustrated in FIG. 4 may be a process corresponding to step 220 of FIG. 2.

Referring to FIG. 4, in step 410, the apparatus for generating animation may detect a central point and an end-effector of the skeleton posture from the posture sketch input. The apparatus for generating animation skeletonizes a binary image representing the posture sketch input by techniques such as distance transformation, Voronoi-skeleton, and thinning known in a computer vision field and represents the skeletonized image by a tree structure. In this case, the apparatus for generating animation may set a root node of the tree structure as a central point and set a leaf node as the end-effector.

In step S420, the apparatus for generating animation calculates a plurality of posture vectors which are differences between the central points and the end-effectors. That is, the apparatus for generating animation may transform the posture sketch input into the simplified posture vector to rapidly retrieve the motion clip in the database in which the plurality of motion clips are stored. In this case, as illustrated in FIG. 5, the database may include five posture vectors for each frame (frame $F_{1,1}$ to frame $F_{1,M}$, in which M is a natural number equal to or more than 2) included in each motion clip ($M_1$ to $M_N$ of FIG. 5, in which N is a natural number equal to or more than 2). That is, the database may store at least one posture vector $v_i$ (i is a preset index to represent a head, a hand (right), a hand (left), a foot (right), and a foot (left)) that is differences between the central points and each end-effector of each frame).

In step 430, the apparatus for generating animation calculates similarity between the posture sketch input and the frame depending on a sum of differences between the posture vectors corresponding to each frame of the motion clips stored in the database and the posture vectors calculated in step 420 and retrieves the motion clip including the frame (hereinafter, called a similar frame) in which the similarity to the posture sketch input is equal to or less than the preset threshold value. For example, the apparatus for generating animation may determine a motion clip $M_i$ as a similar frame when a sum of differences between each posture vector of the posture sketch input and the posture vectors of each of the corresponding frames $F_{i,j}$ is equal to or less than a threshold value. Further, the apparatus for generating animation may perform a process of receiving weight values for each posture vector of the posture sketch input from the user, multiplying the corresponding weight value by the posture vector to perform a correction, and then retrieving and extracting the motion clip. That is, the apparatus for generating animation may apply weight values to some of a head, a left hand, a right hand, a left foot, and a right foot to set an important degree of each part in measuring the similarity of the motions. Therefore, the apparatus for generating animation may determine a frame similar to a motion of a specific part than motions of other parts as a similar frame.

In step 430, the apparatus for generating animation outputs a list of the motion clips retrieved in step 430 through an output interface 115 and receives a motion clip select input selecting any one of the retrieved motion clips through the input interface 110. The apparatus for generating animation generates a similar motion clip including a frame positioned within a frame range (for example, range corresponding to any number of frames among 30 to 120 frames from a similar frame) designated from the similar frame included in the motion clip corresponding to the motion clip select input. In this case, the frame range may be selectively controlled according to the user's input.

Figure 6:
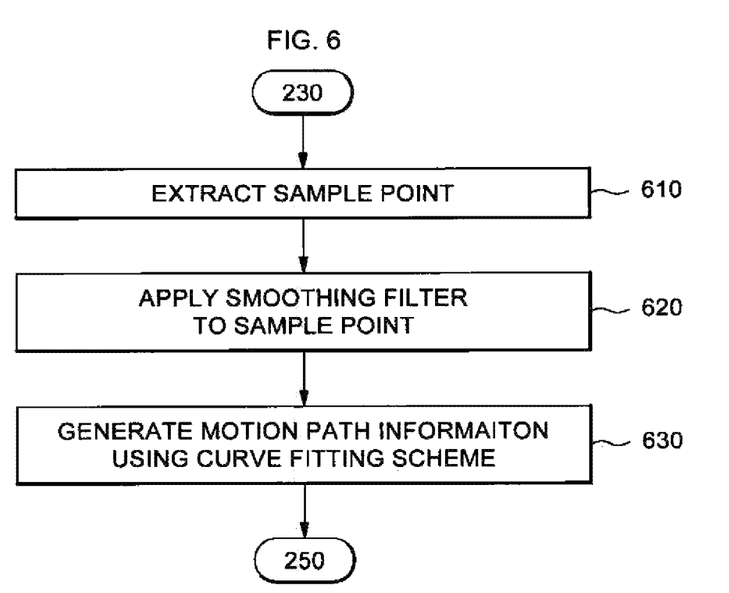
FIG. 6 is a flow chart illustrating a process of generating, by the apparatus for generating animation according to the exemplary embodiment of the present invention, motion path information.
Figure 7:
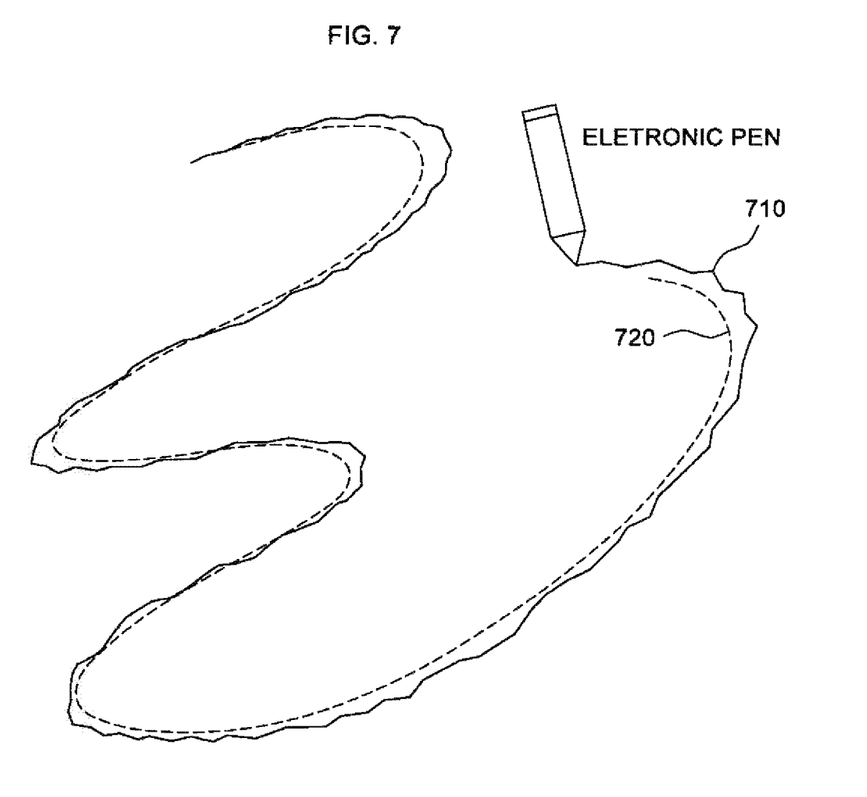
FIG. 7 is a diagram illustrating the motion path sketch input received by the apparatus for generating animation according to the exemplary embodiment of the present invention and a motion path calculated according to the motion path sketch input.

FIG. 6 is a flow chart illustrating a process of generating, by the apparatus for generating animation according to the exemplary embodiment of the present invention, motion path information and FIG. 7 is a diagram illustrating the motion path sketch input received by the apparatus for generating animation according to the exemplary embodiment of the present invention and a motion path calculated according to the motion path sketch input. Hereinafter, each process described with reference to FIG. 6 may be a process corresponding to step 240 of FIG. 2 described above.

Referring to FIG. 6, in step 610, the apparatus for generating animation extracts a sample point from the motion path sketch input. For example, the apparatus for generating animation extracts sample points, which are fitting points for generating a C2 curve, from the motion path sketch input. That is, the apparatus for generating animation may extract a plurality of points satisfying a pre-established condition among the respective points positioned on a line shown in the motion path sketch input as the sample point.

In step 620, the apparatus for generating animation adjusts the position of the sample point using the smoothing filter such as a 1D Gaussian filter.

In step 630, the apparatus for generating animation generates a curved line by a curve fitting scheme such as cubic B-spline depending on the sample point and generates the motion path information representing the corresponding curved line. In this case, the motion path information may be the curved information representing a position of the central point of the 3D character over time.

Therefore, the apparatus for generating animation according to the exemplary embodiment of the present invention may generate the motion path sketch input (for example, 710 of FIG. 7) suddenly changed due to noise caused by user's handshaking, errors of the input apparatus, etc., as the motion path information corrected to show the curved line (for example, 720 of FIG. 7) having smoothing continuity. Therefore, the apparatus for generating animation may generate the motion path suitable to generate the animation even though the motion path input by the unskillful user or the malfunction of the input device occurs.

Figure 8:
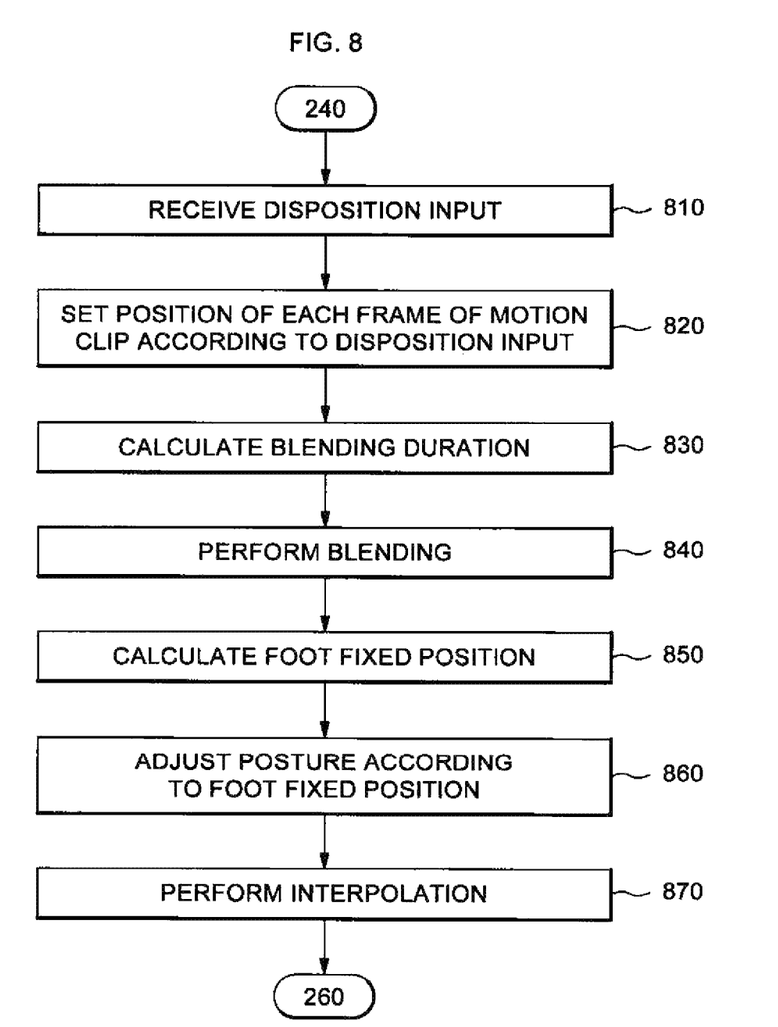
FIG. 8 is a flow chart illustrating a process of disposing a motion clip and generating motion information by the apparatus for generating animation according to the exemplary embodiment of the present invention.
Figure 9:
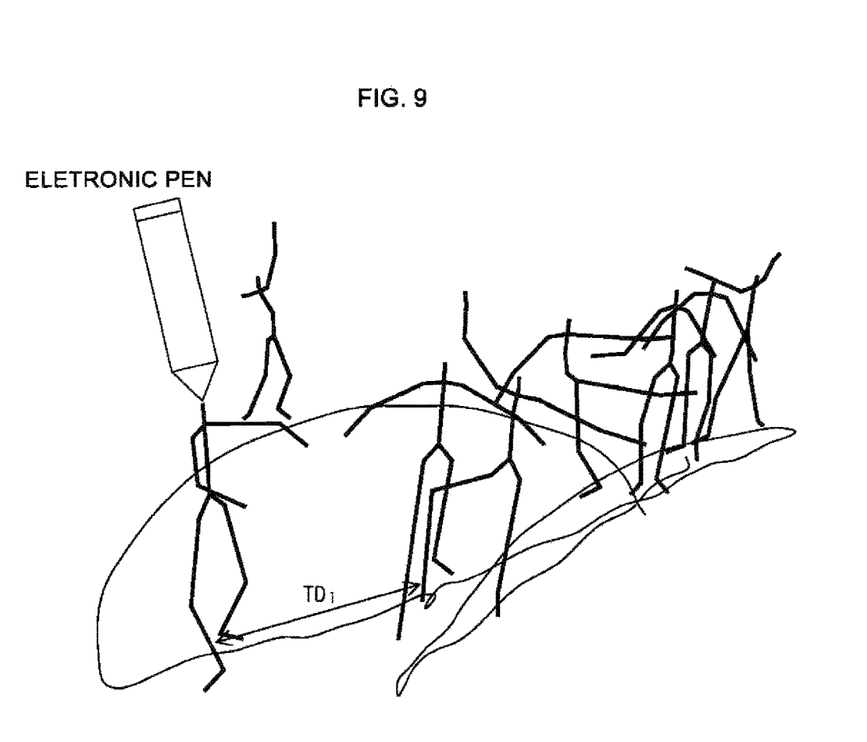
FIG. 9 is a diagram illustrating a process of receiving, by the apparatus for generating animation according to the exemplary embodiment of the present invention, the posture sketch input.

FIG. 8 is a flow chart illustrating a process of disposing a motion clip and generating motion information by the apparatus for generating animation according to the exemplary embodiment of the present invention and FIG. 9 is a diagram illustrating a process of receiving, by the apparatus for generating animation according to the exemplary embodiment of the present invention, the posture sketch input. Each process described below may be a process corresponding to the above step 250 in FIG. 2.

Referring to FIG. 8, in step 810, the apparatus for generating animation receives an input (hereinafter, referred to as a disposition input) to position the central point of the graphic model on the similar frame of the motion clip retrieved in step 220 at any one point of the curved line according to the motion path information from the user.

In step 820, the apparatus for generating animation corrects the position of the similar frame according to the disposition input and generates the motion information to position each frame included in the motion clip including the corresponding similar frame on the curved line according to the motion path information. In this case, the apparatus for generating animation may set the positions on the curved line of each frame so that a difference in time to play the similar frame and each frame is proportional to a distance on the curved line from the point (hereinafter, referred to as a similar frame point) on the curved line corresponding to the similar frame. That is, the apparatus for generating animation may position a frame to be played immediately before the similar frame at a position spaced by −a (a is a preset constant) on the curved line from the similar frame point. Further, the apparatus for generating animation may position a frame to be played immediately after the similar frame at a position spaced by a on the curved line from the similar frame point. Further, the apparatus for generating animation may position a frame after the second similar frame at a position spaced by 2*a on the curved line from the similar frame point. By the above-mentioned process, the apparatus for generating animation may dispose each frame of the motion clip as illustrated in FIG. 9.

In step S830, the apparatus for generating animation calculates a time (hereinafter, referred to as blending duration) required to shift (blend) the motion information from one motion clip of the motion information to other motion clips. In this case, other motion clips are motion clips played immediately after the playing of one motion clip. The graphic models shown in a final frame of one motion clip and start frames of other motion clips take different postures. Therefore, when the two motion clips are played continuously, there is a need to perform the known blending to correct the motion clip so that the posture of the graphic model is smoothly continued. To perform the blending, there is a need to set a blending duration. The apparatus for generating animation may calculate the blending duration depending on the following Equation 1.

$$l_b = \left(\frac{\Delta D_i}{|T_{i,a} - T_{i,b}|}\right)\left(\frac{1}{fr}\right) \quad \text{[Equation 1]}$$

In the above Equation 1, $l_b$ represents the blending duration between a motion clip a and a motion clip b, $\Delta D_i$ represents a maximum value (hereinafter, end-effectors corresponding to the maximum value are referred to as a maximum difference end-effector) among the differences in the corresponding end-effectors of the similar frames of the motion clip a and the motion clip b of $l_b$, $f_r$ represents a frame rate of the motion clip, $T_{i,a}$ represents an average value of the moving distances of the maximum difference end-effectors within the motion clip a, and $T_{i,b}$ represents an average value of the moving distances of the maximum difference end-effectors within the motion clip b.

In step 840, the apparatus for generating animation performs the blending between the continuously played motion clips depending on the blending duration calculated in step 830. Therefore, the apparatus for generating animation according to the exemplary embodiment of the present invention may automatically calculate the blending duration between the motion clips to correct the respective motion clips so that the motions between the motion clips may be naturally continued. In this case, when each motion clip to which the above-mentioned blending is applied is output as it is, the foot-skate phenomenon may occur. Hereinafter, each process to be described below is a process of removing a foot-skate phenomenon.

In step 850, the apparatus for generating animation calculates a foot fixed position for the motion information. For example, the apparatus for generating animation may select the frame (hereinafter, referred to as a foot fixed frame) in which a distance between a foot of the graphic model and ground and an acceleration of a foot among the respective frames of the motion information are equal to or less than preset values and calculate an average on the foot positions of the respective graphic models on the foot fixed frame as the foot fixed position. In this case, the apparatus for generating animation may calculate the acceleration of a foot by known schemes such as a zero-crossings technique.

In step S860, the apparatus for generating animation fixes the foot of the graphic model at the foot fixed position of the graphic model on the foot fixed frame and then applies the inverse kinematics technique to sequentially control knee and hip joints. Therefore, the apparatus for generating animation may remove the foot-skate phenomenon occurring when the user generates animation along a motion path arbitrarily sketched by him/her.

In step 870, the apparatus for generating animation performs interpolation on all joints other than the fixed foot of the foot fixed frame and other frames among the respective frames of the motion information. For example, the apparatus for generating animation may normalize differences between the respective corresponding posture vectors of a final frame of one motion clip and first frames of other motion clips to be in a range from 0 to 1, map ts to the final frame of one motion clip, and map te to the first frames of other motion clips In this case, the ts is time to play the final frame of one motion clip and the te is a sum of the ts and the blending duration. Therefore, the apparatus for generating animation may prevent the phenomenon that the motions of the graphic model between the frames are discontinuous due to the control of the positions of the joints of the graphic model on the foot fixed frame controlled in step 860.

The apparatus for generating animation according to the exemplary embodiment of the present invention may be implemented as a computer system.

Figure 10:
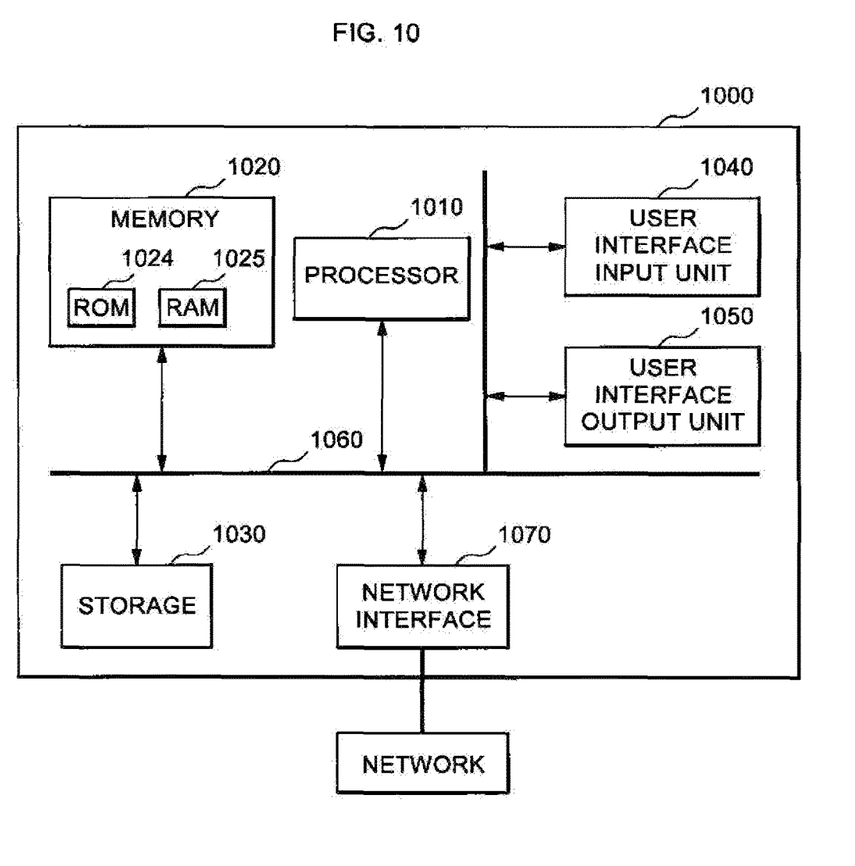
FIG. 10 is a diagram illustrating a computer system in which a mixed reality display apparatus according to an exemplary embodiment of the present invention is implemented.

FIG. 10 is a diagram illustrating a computer system in which the apparatus for generating animation according to an exemplary embodiment of the present invention is implemented.

For example, the exemplary embodiment of the present invention may be implemented as a computer-readable recording medium within the computer system. As illustrated in FIG. 10, a computer system 1000 may include at least one component of at least one processor 1010, a memory 1020, a storage unit 1030, a user interface input unit 1040, and a user interface output unit 1050, all of which may communicate with each other via a bus 1060. Further, the computer system 100 may further include a network interface 1070 for connecting to a network. The processor 1010 may be a CPU or a semiconductor device that executes processing instructions stored in the memory 1020 and/or the storage unit 1030. The memory 1020 and the storage unit 1030 may include various types of volatile or nonvolatile storage media. For example, the memory may include an ROM 1024 and an RAM 1025.

As described above, according to the exemplary embodiment of the present invention, the complex and dynamic motion animation of the 3D character may be generated only by the user's sketch input.

Further, according to the exemplary embodiment of the present invention, the general user with less motion editing experience of the 3D character may produce the animation including his/her desired style of motions without knowledge required to professionally edit the motion.

Further, according to the exemplary embodiment of the present invention, the editing time taken to control the degree of freedom of the joint that is the disadvantage of the existing key-framed scheme may be largely reduced.

Further, according to the exemplary embodiment of the present invention, the apparatus for generating animation may edit the motion path without the degradation in the animation quality, and therefore may be widely used to produce the 3D contents, such as movie, broadcasting, game, and virtual environment, to which the animation of the 3D virtual characters are applied.

Hereinabove, the present invention has been described with reference to exemplary embodiments thereof. Many exemplary embodiments other than the above-mentioned exemplary embodiments fall within the scope of the present invention. It will be understood by those skilled in the art to which the present invention pertains that the present invention may be implemented in a modified form without departing from essential characteristics of the present invention. Therefore, the exemplary embodiments disclosed herein should be considered in an illustrative aspect rather than a restrictive aspect. The scope of the present invention should be defined by the following claims rather than the above-mentioned description, and all technical spirits equivalent to the following claims should be interpreted as being included in the present invention.

What is claimed is:

1. An apparatus for generating animation, comprising:
an input interface receiving a motion path sketch input and a posture sketch input from a user;
a motion path information generator generating motion path information corresponding to the motion path sketch input;
a posture information generator generating posture information corresponding to the posture sketch input;
a similar motion clip retriever retrieving a similar motion clip corresponding to the posture information among motion clips stored in a database;
a motion information generator generating motion information including a frame of the, similar motion clip disposed according to the motion path information; and
an animation generator generating animation by rendering a graphic model according to the motion information,
wherein the posture information generator generates the posture information including end-effectors of each segment of the posture sketch input and a posture feature point corresponding to an intersecting point of three segments,
wherein the similar motion clip retriever calculates a sum of differences between posture vectors included in each frame of the motion clip included in the database and posture vectors according to the posture information and extracts a motion clip including a similar motion frame in which the sum of the differences between the posture vectors is equal to or less than a threshold value as the similar motion clip,
wherein the similar motion clip retriever calculates a sum of differences between posture vectors included in each frame of the motion clip included in the database and posture vectors according to the posture information and extracts a motion clip including a similar motion frame in which the sum of the differences between the posture vectors is equal to or less than a threshold value as the similar motion clip,
wherein the motion information generator receives a disposition input setting a position of a similar frame from the user, corrects positions of each frame included in the similar motion clip according to the disposition input, and generates the motion information including a frame in which the similar motion clips are blended, and
wherein the motion information generator calculates, as a blending duration, a value obtained by dividing differences between maximum difference end-effectors among corresponding end-effectors of each similar frame for one similar motion clip and other similar motion clips by a product of an absolute value of a difference between an average value of moving distances of the maximum difference end-effectors within the one similar motion clip and an average value of moving distances of the maximum difference end-effectors within the other similar motion clips and a frame rate of the similar motion clip, and performs blending between the one similar motion clip and the other similar motion clips through the blending duration.

2. The apparatus of claim 1, wherein the motion path information generator extracts a sample point from the motion path sketch input, adjusts a position of the sample point using a smoothing filter, generates a curved line corresponding to the sample point using a curve fitting scheme, and generates the motion path information representing the curved line.

3. The apparatus of claim 1, wherein the motion information generator sets positions on a curved line of each frame included in the similar motion clip so that a difference in time to play the similar frame and each frame included in the similar motion clip is proportional to a distance from a similar frame point on the curved line.

4. An apparatus for generating animation, comprising:
an input interface receiving a motion path sketch input and a posture sketch input from a user;
a motion path information generator generating motion path information Corresponding to the motion path sketch input;
a posture information generator generating posture information corresponding to the posture sketch input;
a similar motion clip retriever retrieving a similar motion clip corresponding to the posture information among motion clips stored in a database;
a motion information generator generating motion information including a frame of the, similar motion clip disposed according to the motion path information; and
an animation generator generating animation by rendering a graphic model according to the motion information,
wherein the posture information generator generates the posture information including end-effectors of each segment of the posture sketch input and a posture feature point corresponding to an intersecting point of three segments,
wherein the similar motion clip retriever calculates a sum of differences between posture vectors included in each frame of the motion clip included in the database and posture vectors according to the posture information and extracts a motion clip including a similar motion frame in which the sum of the differences between the posture vectors is equal to or less than a threshold value as the similar motion clip,
wherein the motion information generator receives a disposition input setting a position of a similar frame from the user, corrects positions of each frame included in the similar motion clip according to the disposition input, and generates the motion information including a frame in which the similar motion clips are blended, and
wherein the motion information generator selects a frame in which a distance between a foot of a graphic model and a ground and an acceleration of the foot are equal to or less than a preset value among the respective frames of the motion information as a foot fixed frame, calculates an average on positions of the foot of the respective graphic models on the foot fixed frame as a foot fixed position, fixes the foot of the graphic model at the foot fixed position on the foot fixed frame, sequentially controls rest joints of the graphic model according to an inverse kinematics technique, and performs interpolation on all joints other than the foot of the graphic model included in other frames other than the foot fixed frame and the foot fixed frame.

5. A method for generating animation by an apparatus for generating animation, comprising:
receiving a motion path sketch input and a posture sketch input from a user;
generating motion path information corresponding to the motion path sketch input;
generating posture information corresponding to the posture sketch input;
retrieving a similar motion clip corresponding to the posture information among motion clips stored in a database;
generating motion information including a frame of the similar motion clip disposed according to the motion path information; and
generating animation by rendering a graphic model according to the motion information,
wherein in the generating of the posture information corresponding to the posture sketch input, the posture information including end-effectors of each segment of the posture sketch input and a posture feature point corresponding to an intersecting point among three segments are generated,
wherein the retrieving of the similar motion clip corresponding to: the posture information among motion clips stored in the database includes:
calculating a sum of differences between posture vectors included in each frame of the motion clip included in the database and posture vectors according to the posture information; and
extracting the motion clip including a similar motion frame in which the sum of the differences between the posture vectors is equal to or less than a threshold value as a similar motion clip
wherein the generating of the motion information including the frame in which the similar motion clips are blended includes:
setting, as a blending duration, a value obtained by dividing differences between maximum difference end-effectors among corresponding end-effectors of each similar frame for one similar motion clip and other similar motion clips by a product of an absolute value of a difference between an average value of moving distances of the maximum difference end-effectors within the one similar motion clip and an average value of moving distances of the maximum difference end-effectors within the other similar motion clips and a frame rate of the similar motion clip; and
performing blending between the one similar motion clip and the other similar motion clips through the blending duration.

6. The method of claim 5, wherein the generating of the motion path information corresponding to the motion path sketch input includes:
extracting a sample point from the motion path sketch input;
adjusting a position of the sample point using a smoothing filter;
generating a curved line corresponding to the sample point using a curve fitting scheme; and
generating the motion path information representing the curved line.

7. The method of claim 5, wherein in the correcting of the positions of each frame included in the similar motion clip according to the disposition input, positions on a curved line of each frame included in the similar motion clip are set so that a difference in time to play the similar frame and each frame included in the similar motion clip is proportional to a distance from a similar frame point on the curved line.

8. The method of claim 5, wherein the generating of the motion information including the similar motion clip includes:
selecting a frame in which a distance between a foot of the graphic model and a ground and an acceleration of the foot are equal to or less than a preset value among the respective frames of the motion information as a foot fixed frame;

calculating an average on positions of the foot of the respective graphic models on the foot fixed frame as a foot fixed position;

fixing the foot of the graphic model at the foot fixed position on the foot fixed frame and sequentially controlling rest joints of the graphic model according to an inverse kinematics technique; and performing interpolation on all joints other than the foot of the graphic model included in other frames other than the foot fixed frame and the foot fixed frame.

* * * * *